United States Patent [19]

Kentfield

[11] 4,033,120
[45] July 5, 1977

[54] THRUST AUGMENTING FLUID RECTIFIER FOR A PULSED COMBUSTOR

[75] Inventor: John A. C. Kentfield, Calgary, Canada

[73] Assignee: Canadian Patents and Development Limited, Ottawa, Canada

[22] Filed: Aug. 21, 1975

[21] Appl. No.: 606,525

[52] U.S. Cl. .................................. 60/249; 60/39.77
[51] Int. Cl.² .......................................... F02K 7/02
[58] Field of Search ......... 60/247, 248, 249, 39.76, 60/39.77

[56] References Cited
UNITED STATES PATENTS

| 2,738,646 | 3/1956 | Kadosch et al. | 60/39.77 |
| 2,812,635 | 11/1957 | LeFoll et al. | 60/39.77 |
| 2,834,183 | 5/1958 | Bertin et al. | 60/249 |
| 2,919,542 | 1/1960 | Servanty et al. | 60/39.77 |

FOREIGN PATENTS OR APPLICATIONS

| 805,543 | 12/1958 | United Kingdom | 60/39.77 |
| 739,729 | 11/1955 | United Kingdom | 60/39.77 |

Primary Examiner—Carlton R. Croyle
Assistant Examiner—L. J. Casaregola
Attorney, Agent, or Firm—Ronald G. Bitner

[57] ABSTRACT

A thrust augmenting fluid rectifier for a pulsed combustor comprising ducting having a converging inlet section, a flow redirecting section and a diffuser section, the inlet of the ducting being spaced upstream from the combustor inlet to define a thrust augmentor utilizing the backflow from the combustor inlet as primary fluid. In one embodiment the rectifier ducting extends rearwardly to a chamber that combines it with the combustor outlet. Substantial pressure gain is obtainable making the invention suitable for gas turbine applications.

9 Claims, 6 Drawing Figures

THRUST AUGMENTING FLUID RECTIFIER FOR A PULSED COMBUSTOR

BACKGROUND OF THE INVENTION

This invention relates to pulsed combustors and more particularly to a thrust augmenting fluid rectifier for a valveless pulsed combustor.

There have been various proposals for providing a valveless pulsed combustor. Applicant's U.S. Pat. No. 3,543,781 describes a valveless rectifier suitable for pulsed combustors.

Although fluid rectifiers are effective in redirecting inlet backflow, they cause pressure losses and reduce the rating, that is, the amount of fuel that can be consumed by a pulsed combustor of given size.

For gas turbines, substantial improvements in performance can be obtained with combustors that provide a pressure gain. However, it has not been possible to provide significant pressure-gain with valveless pulsed combustors. Applicant has obtained modest pressure gain with a valveless pulsed combustor, using a rectifier of the type described in applicant's aforesaid patent, mounted in a duct to provide two stage ejector-like pumping of secondary flow. However, the best result obtained was a stagnation pressure gain of only 0.8%, at a stagnation temperature ratio of 2.5:1. It was found that the main cause of performance loss was the fluid rectifier.

SUMMARY OF THE INVENTION

It is an object of the present invention to provide a novel fluid rectifier for a pulsed combustor.

A more specific object of the invention is to provide a fluid rectifier that provides thrust augmentation.

Another object of the present invention is to provide a fluid rectifier for a pulsed combustor which generates a substantial pressure gain.

The present invention provides a thrust augmenting fluid rectifier for a valveless pulsed combustor having an inlet duct, a combustion chamber and outlet duct, comprising ducting having a converging inlet section, a flow redirecting section, a diverging section and an outlet. The converging inlet section is spaced upstream from the combustor inlet duct to define an air intake region and is operative to receive backflow from the combustor and secondary air from the intake region. The flow redirecting section is adapted to redirect fluid flowing through the ducting to substantially the same direction as the exhaust from the combustor outlet duct.

DESCRIPTION OF PREFERRED EMBODIMENTS

Figure 1:
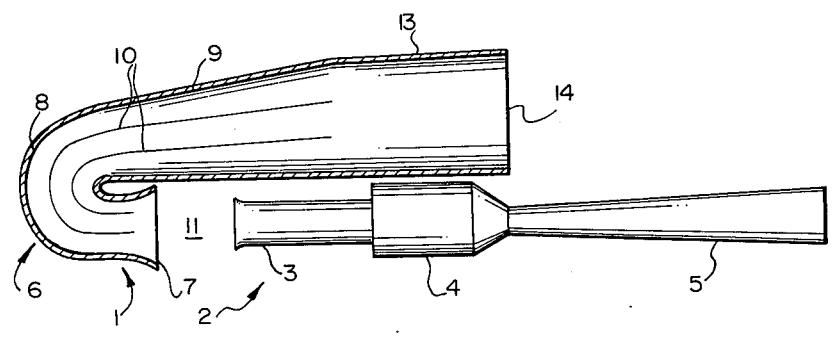
FIG. 1 is a partly sectional schematic view of a pulsed combustor incorporating a thrust augmenting fluid rectifier of the present invention.

FIG. 1 shows the thrust augmenting fluid rectifier 1, combined with a pulsed combustor 2 having an inlet duct 3, a combustion chamber 4, an outlet duct 5, and also a fuel supply, starting ignition, etc., which are not shown. The thrust augmenting fluid rectifier 1, comprises ducting 6, having a converging inlet section 7, a flow redirecting section 8, with guide vanes 10 and a diverging diffuser section 9. The rectifier inlet 7 is spaced coaxially upstream from the combustor inlet 3, defining an air intake region 11. The flow redirecting section 8 redirects fluid flow through about 180°, to substantially the same direction as the exhaust from the combustor outlet duct 5.

The ducting 6 may include a section 13 of constant cross-sectional area which extends downstream from the diffuser section 9, to provide the ducting 6 with a length that optimizes the wave mechanics of the apparatus.

In operation, during the combustion-expansion cycle, backflow from the inlet 3 of the valveless combustor 2 flows into the converging inlet 7 of the ducting 6. The backflow, acting as primary ejector flow, draws secondary air from the intake region 11 into the ducting 6. The backflow and entrained secondary air is turned through 180°, by the redirecting section 8 and guide vanes 10, to exit at outlet 14 in the same direction as the exhaust from the combustor outlet duct 5.

Despite the inevitable losses associated with flow-redirection, the present invention provides an increase in the magnitude of the total thrust; that is, greater than the sum of the pulsed combustor intake thrust and exhaust thrust when no rectifier is employed. This thrust augmentation is achieved by the introduction of the secondary fluid from the intake region 11 into the ducting 6. The non-steady nature of the primary flow, i.e. the backflow from pulsed combustor inlet 3, provides relatively efficient energy transfer to the secondary fluid.

During the intake cycle the combustor 2 draws air from the intake region 11 independently of the fluid rectifier 1. The inertia of fluid flow in the ducting 6 allows the flow to continue after backflow from the combustor inlet 3 has ceased and intake has begun. The resulting simultaneous inflow into the rectifier inlet 7 and combustor inlet 3 enhances thrust augmentation.

Figure 2:
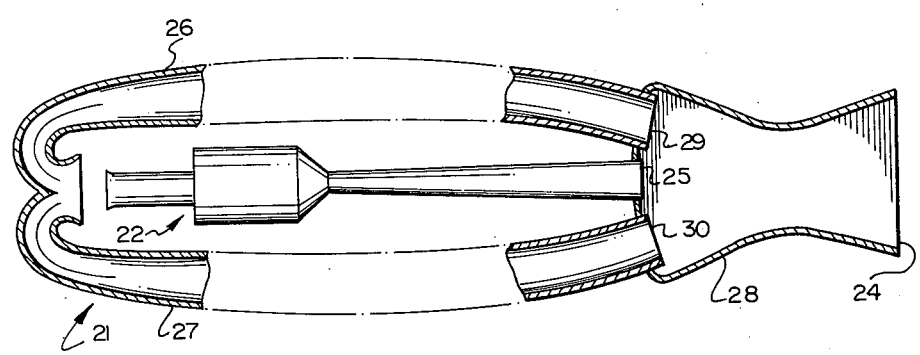
FIG. 2 is a partly sectional, partly fragmented schematic view of another embodiment of a pulsed combustor incorporating the thrust augmenting fluid rectifier of the present invention, particularly adapted to provide relatively high temperature, low mass flow, and pressure gain.

FIG. 2 shows an embodiment of the present invention adapted to generate pressure gain. The ducting of the thrust-augmenting flow rectifier 21 consists of two ducts 26 and 27 which extend rearwardly to the end of the outlet duct 25 of the pulsed combustor 22 to a combining chamber 28. The combined gases from combustor outlet 25 and ducting outlets 29 and 30 exit at converging-diverging ejector defining nozzle 24.

Figure 4:
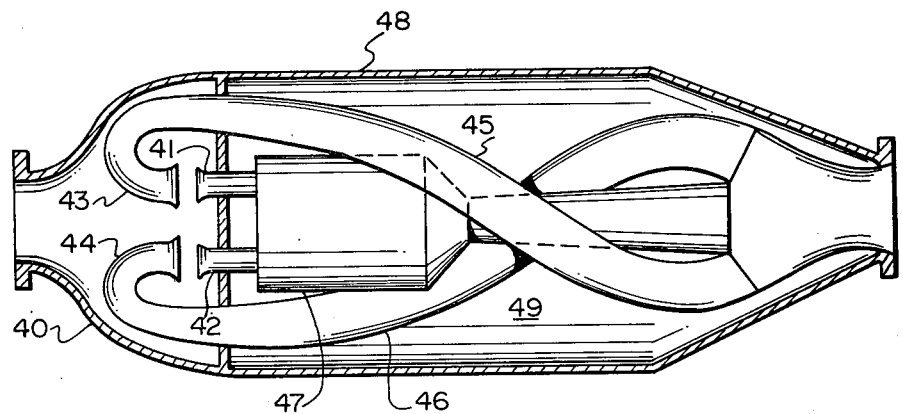
FIG. 4 is a partly sectional schematic view of another embodiment of the invention with multiple combustor inlets.

It appears it may be advantageous to extend the flow path length of ducting 26 and 27 so that a fluid pulse leaving the ducting outlet 29 and 30 is out-of-phase with the exhaust pulse from combustor outlet 25. To achieve this the ducting 26 and 27 can be disposed in a spiral around the central pulsed combustor, as shown in FIG. 4.

Preliminary tests were conducted on an apparatus similar to the type shown in FIG. 2, but using a converging outlet nozzle. Rectangular cross-section ducting 26 was used with an extended flow path to provide out-of-phase operation. Pressure gain exceeded 1% when fuel flow was 20% of maximum. Pressure gain increased with increasing fuel flow. The maximum stagnation pressure gain was greater than 5% at a combustor stagnation temperature ratio of 3.0:1, and was greater than 4% at a temperature ratio of 2.5:1. It appears that optimizing the design would provide higher pressure gain.

Figure 3:
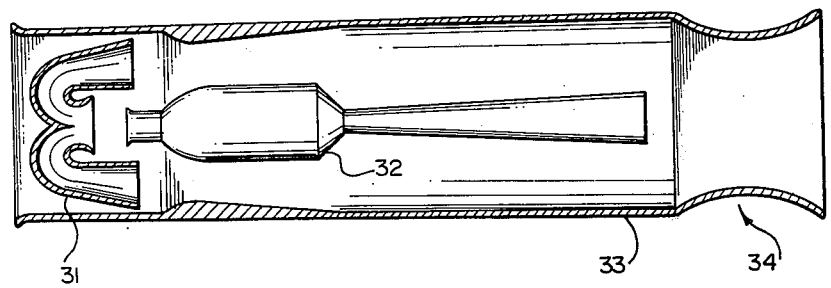
FIG. 3 is a partly sectional schematic view of another embodiment of the invention suitable for relatively high mass flow, low temperature ratio applications.

FIG. 3 illustrates an embodiment of the invention suitable for relatively high mass flow, low temperature ratio applications. The pulsed combustor 32 and thrust-augmenter flow rectifier 31 are disposed within a duct 33. The downstream end of the duct 33, having a converging-diverging section 34, defines an ejector in conjunction with the exhaust from the pulsed combustor 32 acting as the primary fluid. The combination of the rectifier 31 and pulsed combustor 32 operates similar to that described with reference to FIG. 1. The outer duct 34 provides an additional stage of mass flow augmentation utilizing tertiary air which flows into the duct 33 around the rectifier 31.

The fluid rectifier of the present invention may include any convenient number of rectifier ducting units and is not limited to two as illustrated.

FIG. 4 shows an embodiment of the invention having multiple combustor inlets. Multiple inlets permit shortening of a pulsed combustor of prescribed flow cross-section. In FIG. 4, each of the combustor inlets 41 and 42 is provided with a separate rectifier 43 and 44, having ducting 45 and 46 disposed in a spiral around the combustor 47. Separate rectifiers provide more uniform distribution of the ducting around the combustion zone and facilitates using the secondary flow for cooling the combustor. Heat transfer from the combustor 47 to the rectifier ducting 45 and 46 can be improved by the use of an enclosure 48 containing a heat transfer medium 49, such as sodium salts or a molten metal. Alternatively, heat may be transferred from the combustor to the ducting by heat conducting vanes. In FIG. 4, the combustor intake air, and the rectifier secondary air, is supplied through a plenum 40.

When the fluid pulses from the rectifier ducting and combustor are combined and out-of-phase, as in FIG. 4, it may be advantageous to add an anti-backflow device, i.e. a fluid diode, to reduce fluid from the combustor outlet entering the rectifier ducting and also fluid from the rectifier ducting from entering the combustor outlet.

Figure 5:
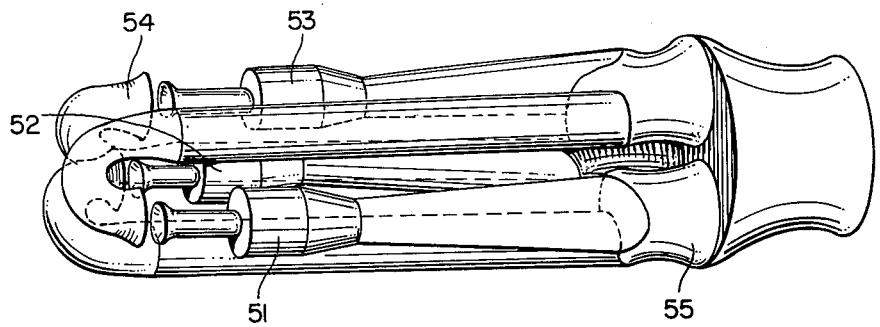
FIG. 5 is a perspective schematic view of another embodiment of the invention with multiple interconnected pulsed combustors.

The use of several combustor units provides more uniform fluid outflow. To lock the operation of individual units together, with the correct phase, coupling between units is desirable. One way this can be achieved and at the same time contribute the benefit of a reduction in the physical length of the ducting is shown in FIG. 5. The rectifier ducting 54 or one combustor 53 is connected with another combustor 52 by means of combining chamber 55. In the embodiment of FIGS. 2 and 4, the desired phase difference is achieved by provision of a suitably long rectifier ducting length. The same effect is achieved in the embodiment of FIG. 5 with relatively short ducting in combination with out-of-phase operation of the combustors. The appropriate number of combustors (three shown in FIG. 5) is dictated by the phase shift required for proper operation of the units. The firing order is 51, 52, 53.

Figure 6:
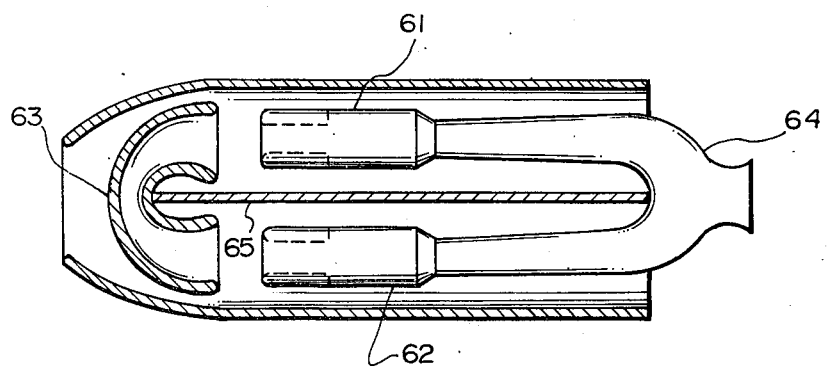
FIG. 6 is a sectional schematic view of another embodiment of the invention which provides charge pre-compression.

FIG. 6 illustrates an embodiment wherein two pulsed combustors 61 and 62 are coupled to provide compression of the charge prior to combustion. A common symmetrical converging-diverging ducting member 63 provides that the inlet backflow from one combustor (61) and entrained secondary air supercharges the other combustor (62), and vice versa. To facilitate out-of-phase operation of the combustors, the outlet ducts are coupled by means of a combining chamber 64. A partition 65 prevents the flow that escapes from the inlet of one combustor from interfering with the inlet of the other combustor. The provision for charge precompression makes the embodiment of FIG. 6 particularly suitable as a pulsejet or a forced convection heater. For optimum operation, both the flow path length within the ducting member 63, and the flow path length through the combustors 61 and 62 to the combining zone 64, are dependent on the wave mechanics of the system.

The present invention is adaptable for a variety of applications. For example, a portable hot gas generator incorporating a single rectifier duct, as in FIG. 1, has been devised for rapid defrosting and warming of equipment in arctic, or cold, climates. The embodiment of FIG. 2 provides relatively high temperature and pressure gain and is suitable for gas turbines. The embodiment of FIG. 3 is best suited for relatively high mass flow, low temperature use applications, for example, space heaters. The present invention may also be used for vehicle propulsion, drying equipment, and fogging equipment to distribute insecticides, etc.

What is claimed is:

1. A thrust augmenting fluid rectifier for a valveless pulsed combustor having an inlet duct, a combustion chamber, and an outlet duct, comprising ducting having a converging inlet section, a flow redirecting section, a diverging section and an outlet, the converging inlet section of the ducting having an inlet cross-sectional area larger than that of the combustor inlet duct, said converging inlet section being spaced upstream from the combustor inlet duct to define an air intake region and being operative to receive backflow from the combustor and secondary air from the intake region, said flow redirecting section being adapted to redirect fluid flowing through the ducting through substantially 180°.

2. The apparatus of claim 1 further comprising a combining chamber disposed downstream from the combustor outlet duct, and wherein the rectifier ducting extends rearwardly and communicates with said combining chamber for combining the fluid from the ducting with the exhaust from the combustor outlet duct.

3. The apparatus of claim 2 wherein the length of the rectifier ducting is greater than the length of the combustor so that a fluid pulse from the ducting is substantially out-of-phase with a fluid pulse from the combustor outlet duct.

4. The apparatus of claim 1 disposed substantially coaxially within an outer duct, said outer duct including at its downstream end a converging-diverging section, and operative in association with the exhaust from the combustor outlet duct, to provide mass flow augmentation.

5. The apparatus of claim 1 wherein the rectifier ducting comprises a plurality of ducts for receiving backflow from the combustor and secondary air from the intake region.

6. The apparatus of claim 1 wherein the combustor comprises a plurality of inlet ducts and having rectifier ducting associated with each of the inlet ducts.

7. A plurality of the apparatus of claim 2 interconnected so that the rectifier ducting of one apparatus communicates with the combining chamber of another apparatus.

8. The apparatus of claim 1 wherein the rectifier ducting comprises a symmetrical converging-diverging member having a similar inlet and outlet section, each operative to function alternately as an inlet and outlet in conjunction with a pair of combustors spaced therefrom, such that the backflow from one combustor compresses a charge in the other combustor.

9. The apparatus of claim 8 wherein the outlet ducts of the combustors are interconnected.

* * * * *